United States Patent
Kjær et al.

(10) Patent No.: US 10,677,218 B2
(45) Date of Patent: Jun. 9, 2020

(54) CONTROL OF A WIND TURBINE DURING RECOVERY AFTER A GRID FAULT

(71) Applicant: VESTAS WIND SYSTEMS A/S, Aarhus N (DK)

(72) Inventors: Martin Ansbjerg Kjær, Harlev J (DK); Kasper Zinck Ostergaard, Flemming (DK); Jan Graugaard-Jensen, Hammel (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/775,356

(22) PCT Filed: Nov. 17, 2016

(86) PCT No.: PCT/DK2016/050373
§ 371 (c)(1),
(2) Date: May 10, 2018

(87) PCT Pub. No.: WO2017/084675
PCT Pub. Date: May 26, 2017

(65) Prior Publication Data
US 2018/0320663 A1  Nov. 8, 2018

(30) Foreign Application Priority Data

Nov. 19, 2015 (DK) .................. 2015 70743

(51) Int. Cl.
*F03D 9/00* (2016.01)
*H02P 9/04* (2006.01)
*F03D 7/02* (2006.01)

(52) U.S. Cl.
CPC ......... *F03D 7/0284* (2013.01); *F03D 7/0224* (2013.01); *F05B 2270/10711* (2013.01);
(Continued)

(58) Field of Classification Search
CPC ............. F03D 7/0224; F03D 7/0284; F05B 2270/309; F05B 2270/328; F05B 2270/335; F05B 2270/10711
See application file for complete search history.

(56) References Cited

U.S. PATENT DOCUMENTS 7,679,215 B2 *  3/2010  Delmerico ............ F03D 7/0284
                                                        290/55
7,834,472 B2 * 11/2010  Rebsdorf .............. F03D 7/0284
                                                        290/44
(Continued)

FOREIGN PATENT DOCUMENTS

CN    102953930 A    3/2013
CN    103001245 A    3/2013
(Continued)

OTHER PUBLICATIONS

PCT International Search Report for Application No. PCT/DK2016/050373 dated Nov. 17, 2016.
(Continued)

*Primary Examiner* — Tulsidas C Patel
*Assistant Examiner* — Thomas K Quigley
(74) *Attorney, Agent, or Firm* — Patterson + Sheridan, LLP

(57) ABSTRACT

Embodiments of the present invention relate to control of a wind turbine during a recovery period after a grid fault. It is disclosed to operate a wind turbine during the recovery period to determine the actual pitch angle of the rotor blades and the actual wind speed, and based on that determining a desired pitch angle of the rotor blades, as well as a pitch ramp rate so that the actual pitch angle can be brought to match the desired pitch angle before the end of the recovery period. In embodiments, the steps performed in the recovery mode are repeated at intervals during the recovery period.

19 Claims, 2 Drawing Sheets

(52) U.S. Cl.
CPC ... *F05B 2270/309* (2013.01); *F05B 2270/328* (2013.01); *F05B 2270/335* (2013.01); *Y02E 10/723* (2013.01)

(56) References Cited

U.S. PATENT DOCUMENTS

| | | | |
|---|---|---|---|
| 2003/0155773 A1* | 8/2003 | Wobben | F03D 7/0224 290/44 |
| 2007/0047163 A1* | 3/2007 | Lutze | F03D 7/0284 361/78 |
| 2008/0084070 A1* | 4/2008 | Teichmann | H02J 3/38 290/55 |
| 2009/0174187 A1* | 7/2009 | Nyborg | F03D 7/0224 290/44 |
| 2009/0218819 A1* | 9/2009 | Miller | H02J 3/386 290/44 |
| 2010/0013224 A1* | 1/2010 | Edenfeld | F03D 7/0224 290/44 |
| 2010/0283247 A1* | 11/2010 | Krueger | F03D 7/0272 290/44 |
| 2010/0295304 A1* | 11/2010 | Rowan | F03D 7/0224 290/44 |
| 2012/0104754 A1* | 5/2012 | Rudolf | F03D 7/0284 290/44 |
| 2013/0043845 A1 | 2/2013 | Harms et al. | |
| 2013/0277973 A1 | 10/2013 | Nyborg | |
| 2014/0152010 A1* | 6/2014 | Larsen | F03D 7/00 290/44 |
| 2015/0035281 A1 | 2/2015 | Lopez Rubio et al. | |
| 2015/0267686 A1* | 9/2015 | Kjær et al. | F03D 7/0224 290/44 |
| 2016/0204601 A1* | 7/2016 | Donescu | F03D 7/0272 361/21 |

FOREIGN PATENT DOCUMENTS

| | | |
|---|---|---|
| CN | 104396113 A | 3/2015 |
| CN | 104604068 A | 5/2015 |
| EP | 2757251 A1 | 7/2014 |
| WO | 2017084675 A1 | 5/2017 |

OTHER PUBLICATIONS

Le H N D et al: 11 Substantial control strategies of DFIG wind power system during grid transient faults 11, TRAN SM I SS Ion and Distribution Conference and Exposition, 2008. T&D. IEEE/PES, IEEE, Piscataway, NJ, USA, Apr. 21, 2008 (Apr. 21, 2008), pp. 1-13. XP031250103, ISBN: 978-1-4244-1903-6 Section I I. E; Section I I I.

Danish Patent and Trademark Office First Technical Examination for Application No. PA 2015 70743 dated May 31, 2016.

PCT Written Opinion of the International Searching Authority for Application No. PCT/DK2016/050373 dated Nov. 16, 2017.

Chinese Office Action for Application No. 201680067155.4 dated May 17, 2019.

* cited by examiner

CONTROL OF A WIND TURBINE DURING RECOVERY AFTER A GRID FAULT

FIELD OF THE INVENTION

The present invention relates to control of a wind turbine, and in particular it relates to control of a wind turbine during a recovery period after a grid fault.

BACKGROUND OF THE INVENTION

Utility grid companies set out the strategies and requirements for the connection of wind turbines to the utility grid. These connection requirements are described in so-called grid codes. The grid codes vary depending upon the geographical location of the utility grid.

One of the topics discussed in grid codes is the capabilities of a wind turbine when the utility grid experiences a fault. One requirement may be that the wind turbine stay connected and synchronized to the utility grid during the grid fault, at least for some types of faults.

When a wind turbine experiences a utility grid fault the generator speed increases almost immediately as a result of the excessive aerodynamic power that cannot be converted to electrical power. Therefore the aerodynamic power must be reduced drastically throughout the period of the utility grid fault. During the fault condition the turbine is operated in a fault mode.

Upon recovery of the utility grid, the wind turbine needs to recover from the fault mode and resume normal operation.

It is against this background that the invention has been devised.

SUMMARY OF THE INVENTION

It would be advantageous to achieve a solution where after the grid fault has ended, the turbines resume normal operation in a fast manner in agreements with grid code requirements.

Accordingly, in a first aspect, there is provided a method for controlling a wind turbine connected to a utility grid, the wind turbine comprises rotor blades, the method comprising:
detecting a fault of the utility grid;
controlling one or more rotor blades in a fault mode;
detecting a recovery of the utility grid;
controlling during a recovery period, one or more rotor blades in a recovery mode, wherein the recovery mode comprises:
determining an actual pitch angle of each of the rotor blades;
determining an actual wind speed;
determining a desired pitch angle of each of the rotor blades according to the actual wind speed;
determining a pitch ramp rate of each of the rotor blades so that the actual pitch angle match the desired pitch angle before the end of the recovery period, and
ramping the pitch angle of each of the rotor blades with the determined pitch ramp rate.

Upon end of the fault period the turbine should resume normal operation. In embodiments of the present invention this can be obtained within a predefined duration of the recovery period, since the actual situation of the turbine at the time of recovery is taken into account. In this manner, it can be ensured that irrespective of the state of the turbine prior to the fault event or at the end of the fault period, the pitch angle reaches a desired pitch angle according to the actual wind speed within a predefined duration of the recovery period.

In an embodiment, the steps performed in the recovery mode are repeated at intervals during the recovery period, such as at each sample of the turbine controller. In this manner the pitch ramp rate is adapted to the actual wind speed throughout the recovery period, and recovery is ensured within a predefined duration of the recovery period.

In further aspects, a control system is provided which is implemented to carry out the method of the first aspect, as well as a wind turbine comprising the control system.

Moreover in a yet further aspect a computer program product is provided, the computer program product comprising software code adapted to control a wind turbine when executed on a data processing system, the computer program product being implemented to control a wind turbine in accordance with any other aspect.

The computer program product may be provided on a computer readable storage medium comprising instructions to cause a data processing system, e.g. in the form of a controller, to carry out the instruction when loaded onto the data processing system.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
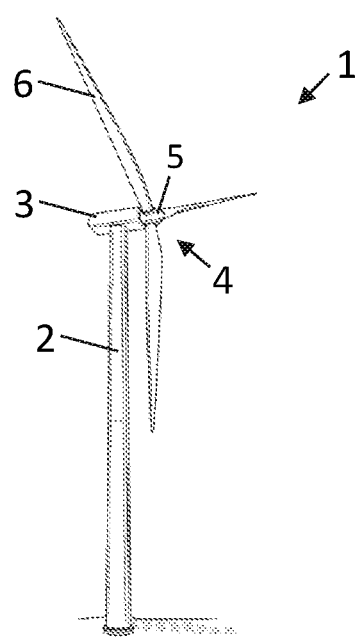
FIG. 1 illustrates an example of a wind turbine.

FIG. 1 illustrates, in a schematic perspective view, an example of a wind turbine 1. The wind turbine 1 includes a tower 2, a nacelle 3 disposed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle or distributed at a number of locations inside (or externally to) the turbine and communicatively connected.

Figure 2:
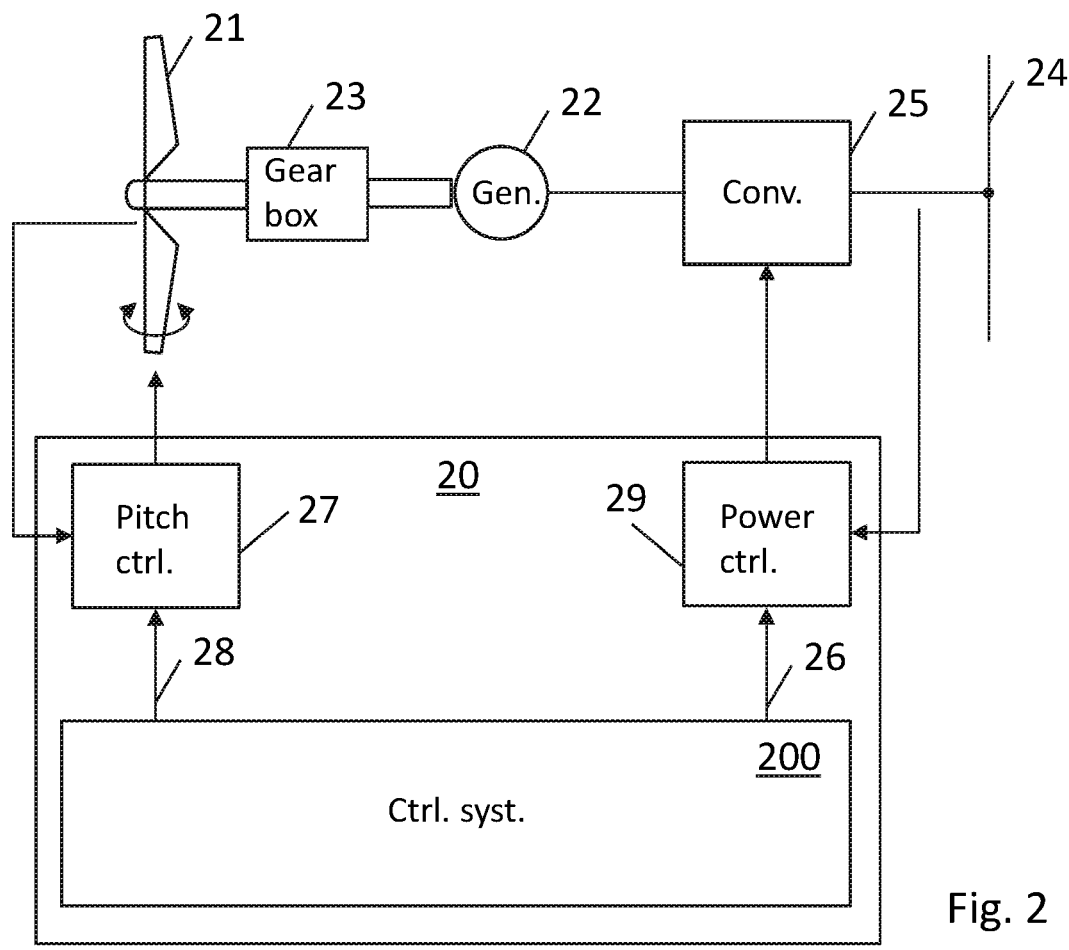
FIG. 2 illustrates an embodiment of elements of a control system.

FIG. 2 schematically illustrates an embodiment of elements of a control system 20 together with elements of a wind turbine. The wind turbine comprises rotor blades 21 which are mechanically connected to an electrical generator 22 via gearbox 23. In direct drive systems, and other systems, the gear box may not be present. The electrical power generated by the generator 22 is injected into a utility grid 24 via an electrical converter 25. The electrical generator 22 can be a doubly fed induction generator, but other generator types may be used.

The control system 20 comprises a number of elements, including at least one controller 200 with a processor and a memory, so that the processor is capable of executing computing tasks based on instructions stored in the memory. In general, the wind turbine controller ensures that in operation the wind turbine generates a requested power output level. This is obtained by adjusting the pitch angle and/or the power extraction of the converter. To this end, the control system comprises a pitch system including a pitch controller 27 using a pitch reference 28, and a power system including a power controller 29 using a power reference 26. The wind turbine rotor comprises rotor blades that can be pitched by a pitch mechanism. The rotor may comprise a common pitch system which adjusts all pitch angles of all rotor blades at the same time, in addition thereto an individual pitch system may be present which is capable of individual pitching of the rotor blades.

Figure 3:
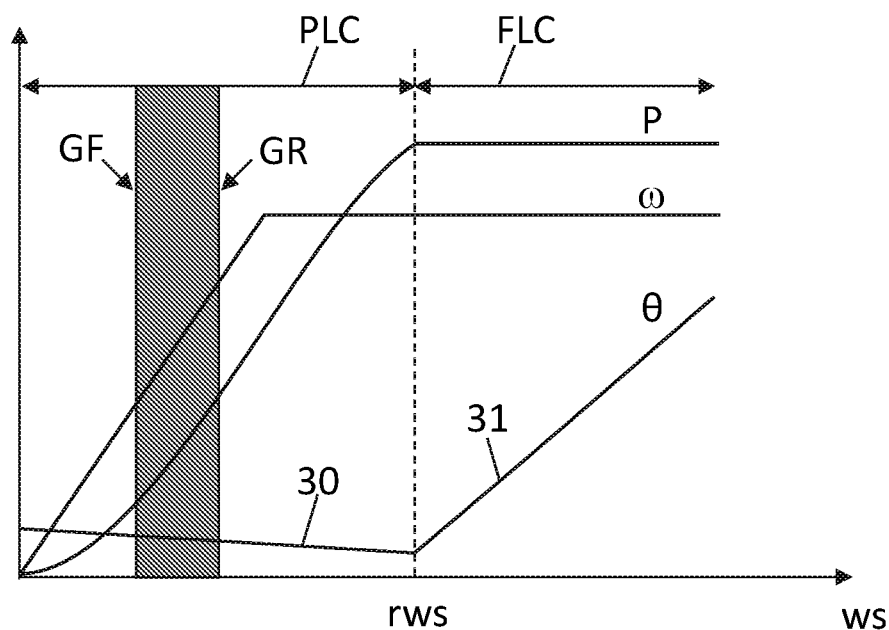
FIG. 3 illustrates schematic examples of parameter curves.

FIG. 3 illustrates schematic examples of the power, P, the generator speed, w, and the pitch angle, θ, as a function of wind speed, ws.

Control of the wind turbine may be done in accordance with a control scheme which is divided into partial load control, PLC, and full load control, FLC. In partial load control, the wind speed is below the rated wind speed, rws, and the wind turbine controller may adjust the pitch of the blades to an aerodynamically optimal pitch angle 30, typically around zero degrees.

During partial load control the specific pitch value, θ, is determined based on wind speed and rotational rotor speed, and the pitch controller 27 pitch the blades according to this value.

Meanwhile, a speed controller compares the rotational speed to an optimal rotor speed and adjusts the electrical power 29 accordingly. Once the wind turbine has reached its rated value, rws, operation is shifted to full load control, here the blade are progressively pitched 31 out of the wind to avoid overspeed of the generator and/or unsafe operation of the turbine, as the wind speed increases.

FIG. 3 illustrates the common pitch angle which is set on all rotor blades. In addition to this pitch setting some turbines may be equipped with an individual pitch system which uses the pitch to compensate for asymmetric loads on the rotor and main bearing. Such a pitch signal is superimposed on top of the common pitch signal.

Embodiments of the present invention deal with the situation where a grid fault, GF, occurs at a first wind speed, and where the wind conditions have changed either during the fault or during the recovery period, so that the recovery period, GR, ends at a different place on the parameter curves.

In the embodiments illustrated in FIGS. 3 and 4, the grid fault occurs when the wind turbine is controlled in partial load operation where the wind speed is below a rated wind speed for the wind turbine. The embodiments of the present invention may also be applied in full load operation, however in FLC control schemes exists where the turbine is not controlled in a manner where the pitch angles follow a given curve, rather the turbine may be controlled to keep the rotor speed constant and the power at the power set-point by adjusting the pitch angle to accomplish this. In embodiments, the disclosed control scheme may therefore only be used for partial load operation, whereas an alternative control scheme for grid recovery is used for full load operation.

Figure 4:
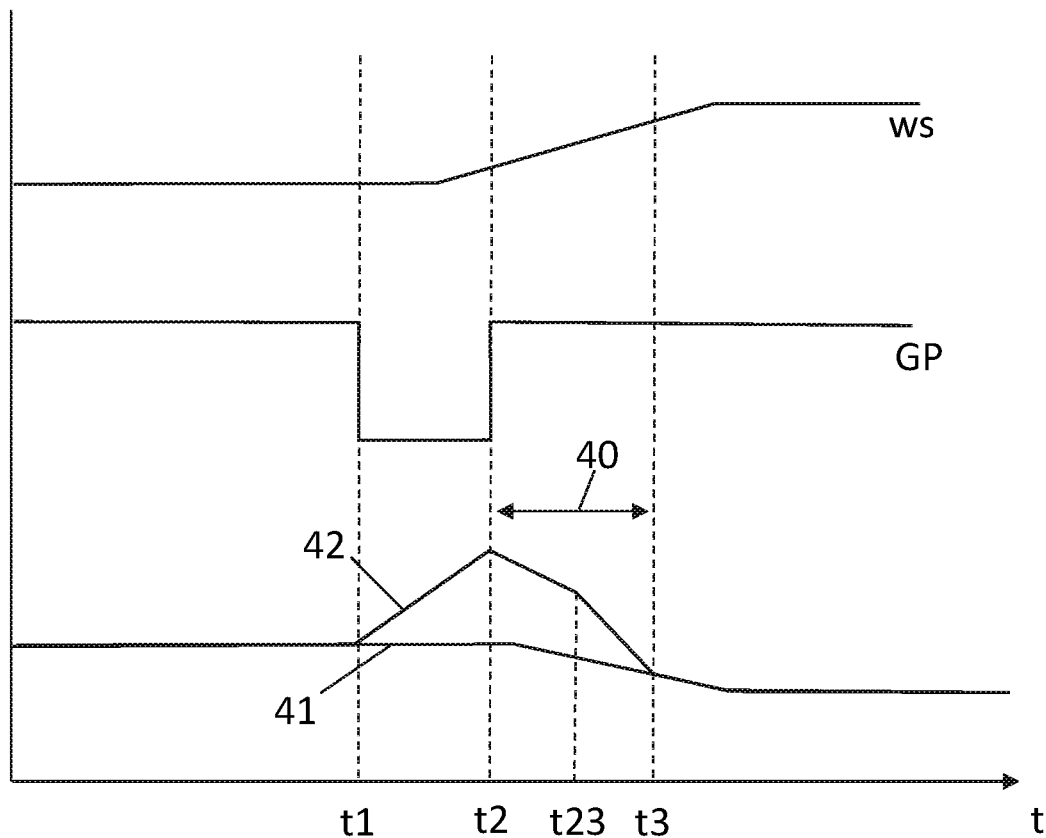
FIG. 4 illustrates a schematic example of pitch angle settings before, during and after a grid fault.

FIG. 4 illustrates a schematic example of pitch angle settings before, during and after a grid fault. FIG. 4 illustrates an embodiment of a grid fault which occurs at time t1. An example of a grid fault may be a so-called low voltage event where the grid code requires the turbines to stay connected to the grid, as long as the fault is limited to a given time span, typically below a few hundred milliseconds. This is sometimes referred to as that the turbine should be able to provide the functionality of low voltage ride through (LVRT). This fault is exemplified by the curve GP schematically illustrating the grid power as a function of time, t, where the grid power is lost at time t1 and is recovered at time t2. The grid code may specify a given recovery period 40 before which the turbine should have resumed normal operation, here shown to be before time t3.

The control system of the turbine may be implemented to detect a fault of the utility grid. This may be done by receiving a signal from a power plant controller or by any other suitable means. At time t1, the grid fault occurs and the turbine is controlled in a fault mode. In the fault mode the wind turbine remains connected and the controller aims at keeping the rotor speed below a given overspeed threshold. In a fault event where the grid voltage drops, the controller can no longer use the power to control the speed and the blades will pitch out to avoid the overspeed, thus in the fault mode the rotor blades will move away from the aerodynamically optimal pitch angle.

FIG. 4 illustrates this situation by showing the optimal pitch angle 41 as a function of time, overlaid with an example of the actual pitch angle 42 as a consequence of the grid fault. At time t2, the grid fault ends, and the recovery of the utility grid is detected. As mentioned, during the grid loss duration the actual pitch angle 42 is moved away from the optimal pitch angle 41, so at the end of the fault period (t2) the pitch angle is no longer at the aerodynamically optimal position.

Upon detection that the grid has recovered at time t2, the turbine is controlled in a recovery mode which aims at ensuring that the pitch angle is back to the aerodynamically optimal pitch angle before the end of the recovery period. To this end, it may be beneficial to pitch the blades back to the optimal pitch curve as slowly as possible within the recovery period in order to avoid loading components of the turbine unnecessary.

In embodiments, the actual situation of the turbine at the time of recovery is taken into account to ensure that the pitch angle reaches a desired pitch angle according to the actual wind speed within a predefined duration of the recovery period. This is obtained in a recovery mode by determining the actual pitch angle of the rotor blades, the actual wind speed at time t2, as well as the desired pitch angle, i.e. the aerodynamically optimal pitch angle, according to the actual wind speed. Based on these inputs, a pitch ramp rate is determined so that the actual pitch angle match the desired pitch angle before the end of the recovery period, and the pitch angle of the rotor blades is ramped with the determined pitch ramp rate.

In embodiments, the desired pitch angle is set to the optimal pitch angle at the actual wind speed. However, the desired pitch angle may be set in an alternative manner. For example, the desired pitch angle may set to the optimal pitch angle at an expected wind speed at the end of the recovery period.

In a situation where the wind speed changes during the recovery period so that the aerodynamically optimal pitch angle at the wind speed at the end of the recovery period also changes, it may be advantageous to repeat the steps of the recovery mode at intervals during the recovery period. Here a single repetition is shown at t23, however it is understood that this may be repeated at a number of times during the recovery period, such at each sample, at each number of samples, or other suitable intervals. In this manner the pitch rate ramp will be adapted during the recovery period, so that the pitch angle at the end of the recovery period 45 is aligned with the optimal pitch angle at the wind speed.

Thus in an embodiment, the recovery mode comprises, at interval(s), repeating to determining an actual pitch angle of each of the rotor blades, determining the actual wind speed and determining the desired pitch angle of each of the rotor blades according to the actual wind speed, that is the aerodynamically optimized pitch angle according to the actual or current wind speed. Based on these inputs, an updated pitch ramp rate of each of the rotor blades is determined, and the pitch angle of each of the rotor blades is ramped with the updated pitch ramp rate.

In embodiment, the aerodynamically optimal pitch angle is a predefined value which is accessible to the wind turbine controller, e.g. via storage in a memory in the turbine or via a network connection to a remote storage. The aerodynamically optimal pitch angle may be stored in any suitable manner, such as in a look up table.

During the recovery period the wind turbine controller control receives the desired pitch angle which is forwarded to the pitch controller 27 and controls the output power by used of a power feedback control loop.

In the example of FIG. 4, the disclosure relates to controlling the common pitch angle, in this example the term one or more pitch blades refer to all blades. In embodiments where individual pitch is used to control rotor loads, the individual pitch actuation may be operated as an independent actuation signal superimposed on the common pitch signal. In embodiments, the individual pitch functionality may also be turned off during the recovery period.

As shown in FIG. 3, not only the optimal pitch angle may change during the grid fault. In embodiments, the turbine controller may be arranged to further determine a desired output power of the wind turbine according to the actual wind speed and a ramp rate of the output power so that the output power match the desired output power before the end of the recovery period. The controller may thereby impose a ramping of the output power with the determined ramp rate.

In embodiments, the ramp rate of the output power and the pitch ramp rate are aligned so that the output power reaches the desired output power at the same time the pitch angle reaches the desired pitch angle.

In a similar manner, also further parameters may be ramped in a similar manner, such as the rotor speed or other parameters which are changed during the fault and/or recovery period.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A method for controlling a wind turbine connected to a utility grid, wherein the wind turbine comprises rotor blades, the method comprising:
    controlling, responsive to detecting a fault of the utility grid, one or more of the rotor blades in a fault mode; and
    within a predefined recovery period after detecting a recovery of the utility grid from the fault:
        estimating a wind speed that is expected to occur at the end of the recovery period;
        controlling one or more of the rotor blades in a recovery mode, wherein controlling the one or more of the rotor blades in the recovery mode comprises, for each rotor blade of the one or more of the rotor blades:
            determining an actual pitch angle of the rotor blade;
            determining a desired pitch angle of the rotor blade according to the wind speed, wherein the desired pitch angle is a predefined aerodynamically optimal pitch angle for the wind speed;
            determining a pitch ramp rate of the rotor blade so that the actual pitch angle matches the desired pitch angle before an end of the predefined recovery period; and
            ramping the pitch angle of the rotor blade according to the pitch ramp rate;
        determining a desired output power of the wind turbine according to the wind speed;
        determining a power ramp rate of an output power of the wind turbine so that the output power matches the desired output power before the end of the predefined recovery period; and
        ramping the output power with the power ramp rate,
    wherein the power ramp rate and the pitch ramp rate are determined so that the output power reaches the desired output power at the same time the pitch angle reaches the desired pitch angle.

2. The method according to claim 1, wherein determining the actual pitch angle, determining the desired pitch angle, determining the pitch ramp rate, and ramping the pitch angle are repeated at intervals during the recovery period.

3. The method according to claim 1, wherein the wind turbine remains connected to the utility grid during the fault of the utility grid.

4. The method according to claim 1, wherein the desired pitch angle is a predefined aerodynamically optimal pitch angle for the wind speed.

5. The method according to claim 1, wherein the wind turbine during the recovery period is controlled by use of a power feedback control loop.

6. The method according to claim 1, wherein the wind turbine is controlled in partial load operation where the wind speed is below a rated wind speed for the wind turbine.

7. A control system for a wind turbine, the control system comprising at least one processor for:
    controlling, responsive to detecting a fault of a utility grid to which the wind turbine is connected, rotor blades of the wind turbine in a fault mode; and
    within a predefined recovery period after detecting a recovery of the utility grid from the fault:
        estimating a wind speed that is expected to occur at the end of the recovery period;
        controlling one or more of the rotor blades in a recovery mode, wherein controlling the one or more of the rotor blades in the recovery mode comprises, for each rotor blade of the one or more of the rotor blades:
            determining an actual pitch angle of the rotor blade;
            determining a desired pitch angle of the rotor blade according to the wind speed, wherein the desired pitch angle is a predefined aerodynamically optimal pitch angle for the wind speed;

determining a pitch ramp rate of the rotor blade so that the actual pitch angle matches the desired pitch angle before an end of the predefined recovery period; and ramping the pitch angle of the rotor blade according to the pitch ramp rate;

determining a desired output power of the wind turbine according to the wind speed;

determining a power ramp rate of an output power of the wind turbine so that the output power matches the desired output power before the end of the predefined recovery period; and ramping the output power with the power ramp rate, wherein the power ramp rate and the pitch ramp rate are determined so that the output power reaches the desired output power at the same time the pitch angle reaches the desired pitch angle.

8. A wind turbine comprising a control system, wherein the control system comprises at least one processor configured to perform an operation comprising:

controlling, responsive to detecting a fault of a utility grid to which the wind turbine is connected, rotor blades of the wind turbine in a fault mode; and within a predefined recovery period after detecting a recovery of the utility grid from the fault:

estimating a wind speed that is expected to occur at the end of the recovery period;

controlling one or more of the rotor blades in a recovery mode, wherein controlling the one or more of the rotor blades in the recovery mode comprises, for each rotor blade of the one or more of the rotor blades:

determining an actual pitch angle of the rotor blade;

determining a desired pitch angle of the rotor blade according to the wind speed, wherein the desired pitch angle is a predefined aerodynamically optimal pitch angle for the wind speed;

determining a pitch ramp rate of the rotor blade so that the actual pitch angle matches the desired pitch angle before an end of the predefined recovery period; and ramping the pitch angle of the rotor blade according to the pitch ramp rate;

determining a desired output power of the wind turbine according to the wind speed;

determining a power ramp rate of an output power of the wind turbine so that the output power matches the desired output power before the end of the predefined recovery period; and ramping the output power with the power ramp rate, wherein the power ramp rate and the pitch ramp rate are determined so that the output power reaches the desired output power at the same time the pitch angle reaches the desired pitch angle.

9. The wind turbine according to claim 8, wherein determining the actual pitch angle, determining the desired pitch angle, determining the pitch ramp rate, and ramping the pitch angle are repeated at intervals during the recovery period.

10. The wind turbine according to claim 8, wherein the wind turbine remains connected to the utility grid during the fault of the utility grid.

11. The wind turbine according to claim 8, wherein the desired pitch angle is a predefined aerodynamically optimal pitch angle for the wind speed.

12. The wind turbine according to claim 8, wherein the wind turbine during the recovery period is controlled by use of a power feedback control loop.

13. The wind turbine according to claim 8, wherein the wind turbine is controlled in partial load operation where the wind speed is below a rated wind speed for the wind turbine.

14. A computer program product comprising software code adapted to, when executed on a data processing system, control a wind turbine according to an operation comprising:

controlling, responsive to detecting a fault of a utility grid to which the wind turbine is connected, rotor blades of the wind turbine in a fault mode; and within a predefined recovery period after detecting a recovery of the utility grid from the fault:

estimating a wind speed that is expected to occur at the end of the recovery period;

controlling, one or more of the rotor blades in a recovery mode, wherein controlling the one or more of the rotor blades in the recovery mode comprises, for each blade of the one or more of the rotor blades:

determining an actual pitch angle of the rotor blade;

determining a desired pitch angle of the rotor blade according to the wind speed, wherein the desired pitch angle is a predefined aerodynamically optimal pitch angle for the wind speed;

determining a pitch ramp rate of the rotor blade so that the actual pitch angles match the desired pitch angle before an end of the predefined recovery period; and ramping the pitch angle of the rotor blade according to the pitch ramp rate;

determining a desired output power of the wind turbine according to the wind speed;

determining a power ramp rate of an output power of the wind turbine so that the output power matches the desired output power before the end of the predefined recovery period; and ramping the output power with the power ramp rate, wherein the power ramp rate and the pitch ramp rate are determined so that the output power reaches the desired output power at the same time the pitch angle reaches the desired pitch angle.

15. The wind turbine according to claim 14, wherein determining the actual pitch angle, determining the desired pitch angle, determining the pitch ramp rate, and ramping the pitch angle are repeated at intervals during the recovery period.

16. The wind turbine according to claim 14, wherein the wind turbine remains connected to the utility grid during the fault of the utility grid.

17. The method of claim 1, wherein the predefined recovery period is specified by a grid code.

18. The method of claim 1, further comprising, within the predefined recovery period:

determining a rotor speed; and ramping the rotor speed according to a rotor speed ramp rate so that the rotor speed matches a desired rotor speed before the end of the predefined recovery period.

19. The method of claim 6, further comprising:

adjusting, responsive to detecting a fault of the utility grid while the wind speed is at least a rated wind speed for the wind turbine, the pitch angles of the rotor blades to maintain a constant rotor speed and to maintain the output power at a power set point.

* * * * *